March 19, 1957 — R. ANDERSON — 2,785,673
FEMORAL PROSTHESIS
Filed May 6, 1952 — 3 Sheets-Sheet 1

INVENTOR.
ROGER ANDERSON
BY
ATTORNEY

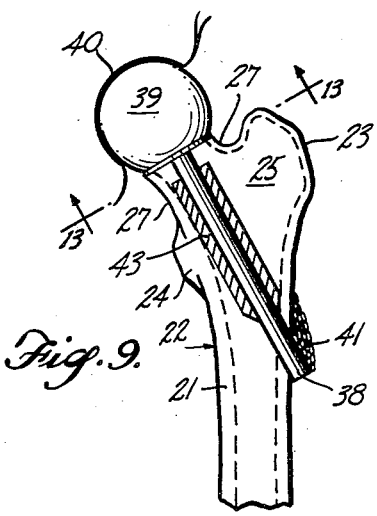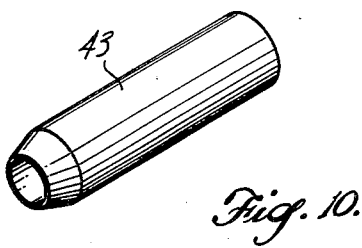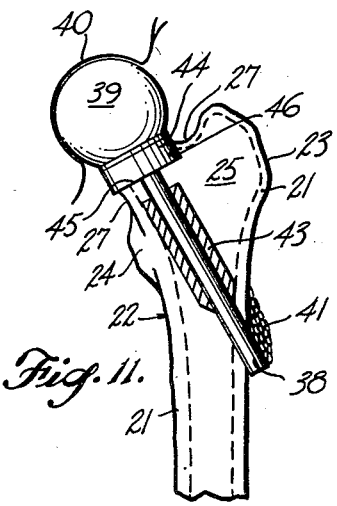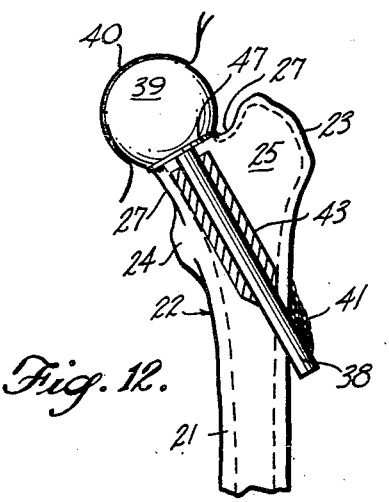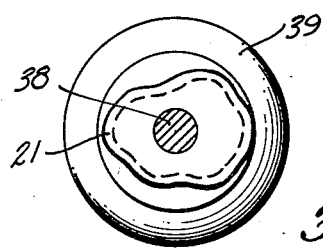

March 19, 1957 R. ANDERSON 2,785,673
FEMORAL PROSTHESIS
Filed May 6, 1952 3 Sheets-Sheet 3

INVENTOR.
ROGER ANDERSON
BY
Clinton L. Mathis
ATTORNEY

2,785,673

FEMORAL PROSTHESIS

Roger Anderson, Seattle, Wash.

Application May 6, 1952, Serial No. 286,280

3 Claims. (Cl. 128—92)

My invention relates to a femoral prosthesis and to the method of applying the same.

The idea of replacing a worn out hip joint with a new glossy femoral head prosthesis and possibly a new socket joint in a pelvic bone has been the subject matter of considerable thinking of orthopedic surgeons. Despite the work of many orthopedic surgeons in this field, such as Bohlman, Jaenichen, the Judet brothers, McBride, Thomson, and others, a long felt need in this art has been felt in order to provide a practical femoral prosthesis as well as one which will permit a practical method or application of utilizing the same.

Some of the outstanding advantages which are accomplished by my invention and which have not been accomplished in the prior art are: First, the femoral head of my prosthesis has been designed with a flat under-surface for wide and even weight distribution against a flattened upper end portion of a femur; second, the pedicle or stem of the prosthesis of my invention cooperates with a lateral opening in the femur so as to provide for automatic adjustments for the inevitable bone absorption following the femoral prosthesis operation; third, the structure and technic for employing said structure permits restitution of the femoral neck to former proportions; fourth, the apparatus and method of my invention permits practical positioning of the pedicle or stem of my femoral prosthesis so that said stem may be located sufficiently close to the vertical normal weight bearing line of the femur so as to minimize strain on the femur and on the femoral prosthesis; and fifth, my invention results in a femur cooperating with a femoral prosthesis so that there is assurance of normal, co-axial articulation for the patient.

It is an object of my invention to provide a femoral prosthesis and a technic for employment of the same wherein the femur supports the femoral head prosthesis in a way to evenly divide the weight on the femur to provide for permanency, elimination of undue strain on the femur, distribution of the strain on the femur on at least three spaced areas and areas which are relatively strong in hard cortex bone.

To overcome many of the shortcomings presented by the prior art of femoral prostheses, I provide for supporting the femoral head prosthesis over a large area at the region of the femoral neck. Next I provide a pedicle or stem supporting the femoral prosthesis head so that the head is free to rotate about an axis determined by three weight bearing or supporting areas. First, I provide a support for the bottom of the prosthesis head in the nature of a flat area at the region of the femoral neck, next, I provide a support for the prosthesis stem or pedicle at an area within the femoral canal and at a level which may be termed the lateral aspect of the medial cortex of the lower end of the femoral neck, and next I provide another support for said stem or pedicle by an opening passing through a lateral wall of the femur below the greater trochanter and aligned to provide a maximum vertical thrust on the femur by weight carried by the femoral head prosthesis.

Next, due to the position of the stem or pedicle supporting the femoral head prosthesis of my invention, there is a minimum strain or resistance against rotation of the femoral head of the prosthesis when the same is in use which assures substantially normal, and co-axial articulation of a femur supported by a femoral head prosthesis of my invention.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in this art.

Figure 3:
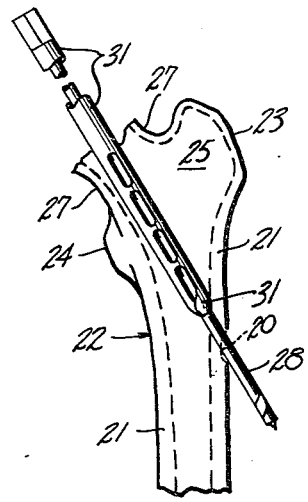
Fig. 3 is a view similar to Fig. 2 except that the drill-guide has been left in place and has been used to guide a cannulated medullary drill, which cannulated medullary drill is employed to remove cancellous bone and provide an enlarged drill opening aligned with the drill opening indicated in Fig. 2 of the drawings.
Figure 4:
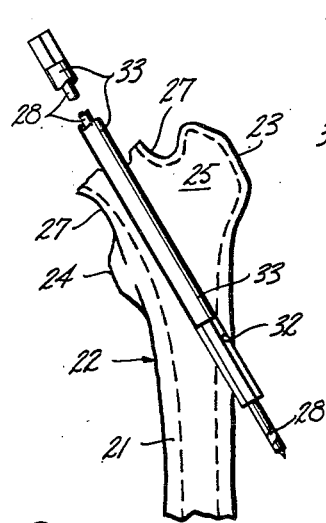
Fig. 4 is a view similar to Fig. 3 of the drawings except that a cannulated cortex drill has been placed over the drill-guide member illustrated in Fig. 2 of the drawings and the opening through the cortex layer drilled thereby is indicated.
Figure 5:
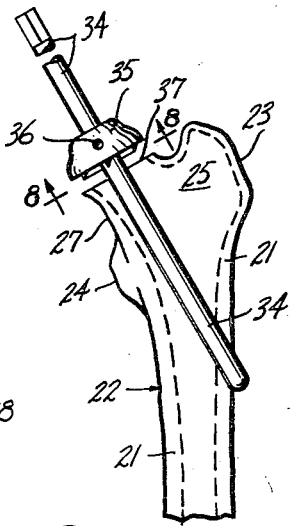
Figure 6:
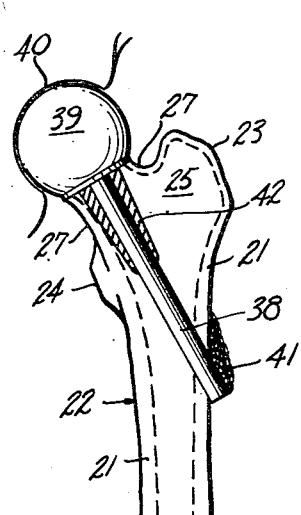
Figure 8:
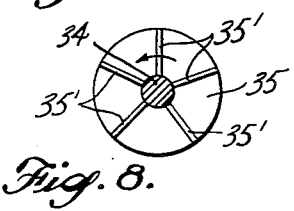
Figure 7:
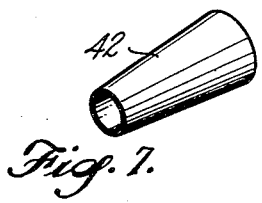
Figure 15:
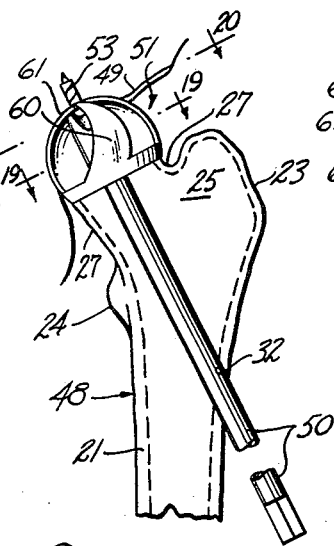
Figure 16:
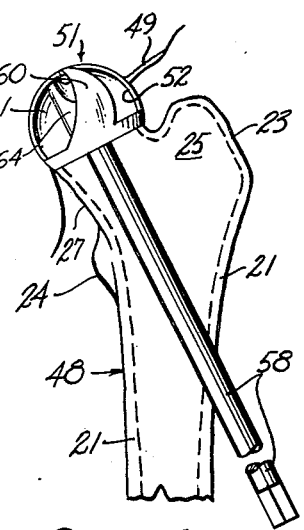
Figure 18:
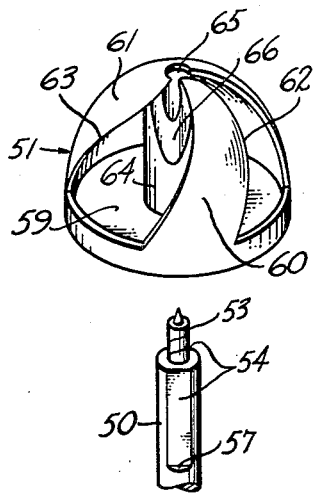
Figure 19:
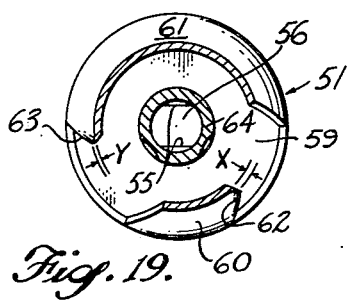
Figure 20:
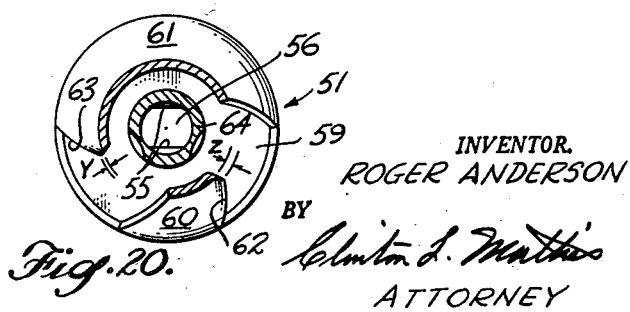

Fig. 5 of the drawings illustrates the use of a neck facer cutter in combination with the opening which was provided by reason of the drills illustrated in Figs. 1–4 of the drawings;

Fig. 6 illustrates a femur having the opening and faced neck as provided in the previous figures and in which there is inserted a femoral prosthesis of my invention;

Fig. 7 is an enlarged perspective view of a truncated cone weight-bearing member shown in Fig. 6 of the drawings;

Fig. 8 is an enlarged bottom plan view of the neck facer shown in Fig. 5 and taken substantially on broken line 8—8 of Fig. 5;

Fig. 9 is a view similar to Fig. 6 of the drawings, except that a sleeve-like weight bearing member is employed in connection with said figure instead of the truncated cone weight-bearing member shown in connection with Fig. 6;

Fig. 10 of the drawings is an enlarged perspective view of the sleeve weight-bearing member which was employed in connection with the showing in Fig. 9 of the drawings;

Fig. 11 is a view similar to Fig. 6 of the drawings illustrating the use of my invention where the femoral neck is substantially removed and a spacer member is employed to compensate for the shortening which is necessarily incident to the removal of such amount of femoral neck and to provide a reconstruction wherein the normal formerly existing distance between the femoral head and the femur obtains;

Fig. 12 is a view similar to Fig. 9 except the upper end portion of the femoral neck shown in Fig. 6 has been absorbed and the femoral prosthesis has moved downwardly;

Fig. 13 is an enlarged view in section with parts shown in elevation and taken substantially on broken line 13—13 of Fig. 9;

Figs. 14 to 17 inclusive, illustrate fragments of a femur and fragments of a pelvic bone and illustrate consecutive steps which are useful in my invention in providing a femoral head socket in an acetabulum bone of the pelvic bones and to provide a femoral head prosthesis in a femur which will cooperate with the said socket provided in said pelvic bone;

Fig. 18 is an enlarged perspective view of the socket cuttter-reamer and associated shaft shown in Figs. 15 and 16 of the drawings;

Fig. 19 is a sectional view of the said socket cutter-reamer taken substantially on broken line 19—19 of Fig. 15 and with cutting projections somewhat exaggerated for purposes of illustration; and Fig. 20 is a view similar to Fig. 19 and taken substantially on broken line 20—20 of Fig. 15.

In order to present the upper end of the femur of a human body to permit utilization of my invention, an incision may be made in accordance with standard practices. In other words, the incision may be either postero-lateral, straight lateral, or antero-lateral. With the area adjacent the upper portion of the femur exposed, then the periosteum or sheath on the outside of the femur is reflected from the lateral shaft an extent to permit the making of a deep groove with a small sharp chisel at a point just posterior to the center of the shaft and at a distance of about two inches distal to the distal edge of the greater trochanter. The said distance of about two inches, of course, varies with individual patients and the point or area to be chiseled is one so that a shaft may be aligned with such area, aligned with substantially the neck of the femoral head, and further aligned to be close to but not in contact with the lateral aspect of the medial cortex of the lower end portion of the femoral neck.

Figure 1:
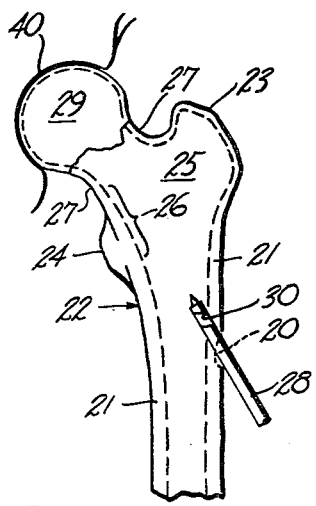
Fig. 1 is a fragmentary elevational view indicating fragment of a fractured femur and a fragment of a pelvic bone providing the natural socket for receiving a femoral head, also said figure depicts one of the first steps employed in connection with the practicing of my invention.
Figure 2:
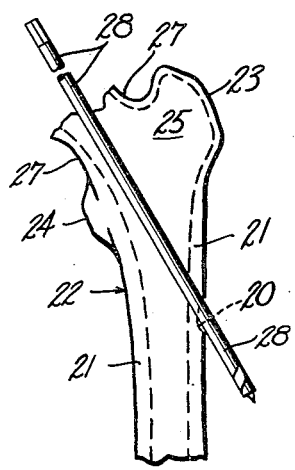
Fig. 2 is a view similar to Fig. 1 showing a subsequent step in the operation and where the natural femoral head has been removed and a drill-guide has been inserted angularly through the femoral neck, downwardly through the femoral canal and out a lateral cortex layer of the femur below the greater trochanter.

Referring now to Fig. 1 of the drawings, a chiseled area 20 is provided in the cortex layer 21 of a femur fragment 22. The said femur 22 is typical but obviously the femurs of individual patients will differ in dimensions, sizes and contours. In said femur 22, the greater trochanter 23 and lesser trochanter 24 are indicated. By dash lines the inner wall of the cortex layer 21 is shown so that with the the outer wall thereof the thickness is indicated. Also, the cancellous bone is indicated by 25. The lateral aspect of the medial cortex of the lower end portion of the femoral neck is indicated by the area included within the bracket numbered 26. This said lateral aspect of the medial cortex 26 is within the femur and at the level of or slightly above the lesser trochanter 24 as is indicated on Fig. 1 of the drawings. The femoral neck 27 is a neck-like portion bounded by a cortex layer and said femoral neck is generally of oval shape in section. It is desired to eventually place a shaft through an opening to be provided through the chiseled area 20 and aligned substantially with the central portion of the femoral neck 27 and which shaft will be definitely spaced from the cortex layer at the level of the area 26.

At the chiseled area 20, a small drill, such as one cutting a 5/32" hole, is operated and the drill aligned in a plane substantially as indicated in Fig. 1 of the drawings. The drill 28 may be of the type generally known in the art as a "Crowe" pointed guide pin. A drill opening, as indicated in Fig. 1 of the drawings, is toward the center of the femoral neck 27, but the drilling is just through the lateral cortex layer 21 at this area and any continued drilling upwardly beyond the area indicated into the medial cortex may needlessly traumatize the said medial cortex layer. In referring to the medial cortex as just mentioned, reference is being made to the canal and medial portion of a femur and which medial portion is surrounded by the cortex layer 21 and at the level indicated, the said canal will be filled with cancellous bone 25.

Then the drill 28 is removed, and the capsule which surrounds the femoral head is split or resected or cut away so as to expose the femoral head 29. If desirable, a sub-capital osteotomy, or cutting away of the femoral head is performed and the head removed. Then the femur 22 is dislocated to present the femoral neck surface, so that suitable and desirable further procedures may be performed.

The drill-guide 28 is now inserted into the femoral neck 27 and approximately at the mid-portion thereof and directed toward the opening 30 which was previously made by the drill 28 in the area 20 as previously described. Thus, the drill-guide pin 28 may be caused to assume the position shown in Fig. 2 of the drawings. In this position the drill-guide member 28 may be utilized as a guide.

Next, a cannulated medullary drill 31 (designed to cut away and remove cancellous bone and of the type having a centrally aligned opening), is slid over the proximal or upper end of the guide 28 and the said drill 31 is rotated to cause cutting away of cancellous bone to provide the opening indicated in Fig. 3 of the drawings. In positioning the drill-guide 28 in both Figs. 2 and 3 of the drawings, it is to be noted that a space has been left between the area 26 and the outer periphery of the cannulated medullary or spoon drill 31. Drill 28, after entering the opening 30, assumes the position shown in Fig. 2 of the drawings. In aligning the original drill opening 30, the orthopedic surgeon, of course, can only approximate the exact position of the area 26 and hence should provide an alignment which will substantially miss such area and provide the space mentioned between the said area 26 and the periphery of the spoon drill 31 as described in connection with Fig. 3 of the drawing. Obviously, when the drill-guide 28 operates from above and is passed downwardly through the neck 27 of the femur and through the cancellous bone 28 in the canal between the lateral cortex layer 21, the drill point of the drill 28 can engage the opening 30, and the opening 30 will determine the exact alignment which will be given to the drill 28.

Next, the spoon drill 31 is removed but the drill-guide 28 is left in place. Then the opening 30 in the cortex 21 is enlarged and is provided with a precise drilled opening 32. This may be accomplished by sliding a cannulated cortex drill 33 (designed to drill hard cortical bone) over the guide 28 and rotating said drill 33 to provide the precise drill opening 32. The drill opening 32 is thus substantially aligned with the central opening of the neck 27.

After the opening 32 is provided as indicated in connection with Fig. 4 of the drawings, the drills 33 and 28 are removed and a neck facer is employed. The stem 34 rigidly carries the facer tool 35 as by a set screw 36 interconnecting the same. The stem 34 is moved downwardly through the opening 32 in the cancellous bone 25 as well as the opening 32 in the cortex layer 21. The facer tool 35 has cutting blades 35' on its lower face, as shown, and is disposed to cut in a plane positioned at right angles to the axis of the stem 34 or in other words, at right angles to the axis of the opening 32. The facing tool 35 provides a continuous face 37 on the neck 27 or on a desired upper portion of the femur 22. As explained herein, the face 37 may be provided on the neck 27 or it may be provided partially on the neck 27 and partially on bone adjacent to the greater trochanter 23. The exact location of the face 37 will be determined by the orthopedic surgeon by factors including the condition of the femur of a particular patient. The face 37 should be maintained at the highest possible level considering all the factors entering into a particular operation.

After the face 37 has been provided, the stem 34 and the facer tool 35 thereon are removed, then the femoral prosthesis of my invention which comprises the stem or pedicle 38 and femoral head 39 is inserted in place. The stem 38 is of a size to precisely mate with the opening 32 or, in other words, the drill 33 was selected to provide an opening 32 so that the stem 38 would have in effect a machine fit with the opening 32.

The femoral head 39 of the prosthesis is formed of suitable material to provide for desired strength, weight, and inertness toward body tissue, such as a nylon polymer, a stainless steel, or a methylmethacrylate polymer. Also other material commonly employed to provide a femoral head prosthesis can be employed in connection with my invention. As to the stem 38 it is preferably a tubular member to provide maximum strength with a minimum mass and to facilitate cutting to length as is hereafter explained. The material utilized in forming tubular stem 38 may be that commonly employed in making stems or shafts or pedicles of a femoral prosthesis, as stainless steel or a plastic shaft reinforced with an interfitting stainless steel rod or tube.

The socket 40 in the acetabulum of a patient will vary in size with particular patients. Thus, the femoral head 39 must be of a size to match the socket 40, if the socket 40 is to be used without change, and I have found it practical to provide femoral heads 39 in various sizes, such as 39 to 55 millimeters in diameter and with a variation between individual sizes of 2 mm., i. e., 39, 41, 43, etc. mm. in diameter. The stems 38 may all be of a common diameter and in order to accommodate different lengths of stems required, the stems 38 are longer than that normally required. Thus, after the desired length of the pedicle or stem 38 is determined by insertion of the same in place through the opening 32, the stem 38 and femoral head 39 are removed and the stem 38 cut to the proper length. The proper length is so that the stem 38 just protrudes out of the lateral cortex layer 21 as is indicated in Fig. 6 of the drawings.

After the length of the stem or pedicle 38 has been determined and the said stem 38 cut to fit an individual patient, then a thrust bearing member, such as the truncated cone 42 shown in perspective in Fig. 7 of the drawings, is employed. The face 37 on the femoral neck 27 is inspected to determine the size of cone member 42 to be employed. The function of the cone member 42 is to provide a thrust receiving bearing so that the stem 38 at the level of the area 26 directly imposes side thrust against a portion of the truncated cone 42 and against the area 26. In Fig. 6 of the drawings I have indicated the truncated cone 42 in place. However, it is to be expressly understood that the sleeve 43 of Fig. 9 may be employed instead of the truncated cone 42 which is shown in connection with Fig. 6 of the drawings. As will be hereinafter explained, either the truncated cone 42 or the sleeve 43 provides for a bearing or supporting member between the stem 38 and the cortical bone 21 at the area 26 so that each of the said bearing members will remain in place and not descend too low or too far down the stem 38 and at the same time each may be selected from a number to provide the desired size and precisely provide for a direct bearing between the stem 38 and the area 26.

After the stem 38 has positioned thereon the desired cone 42 or sleeve 43, then the complete prosthesis is inserted in position as shown in Fig. 6. Then the outer surface of the cortex layer just above the protruding portion of the stem 38 is preferably freshened to stimulate bone growth thereon. This means that the outer surface of the cortex layer at this area is scored or chiseled to be in a condition to properly stimulate bone growth. Then bone particles 41 are placed as indicated in Fig. 6 of the drawings and in proper cases this tends to augment bone growth and subsequent increased thickness of the cortex bone layer 21 at the area of the bone particles 41. The said bone particles may be obtained as taught in my copending application filed January 18, 1950, bearing Serial No. 139,172, now Patent 2,690,198, and relating to such subject matter.

Next, usual methods employed in connection with a femoral prosthesis operation are employed. These will include reducing the femoral dislocation or, in other words, properly aligning the femoral head 39 in the socket 40 and then closing the incision in the skin or leg of the patient. The post-operative care of the patient may be similar to that commonly employed in femoral prosthesis operations.

Now referring to Fig. 11 of the drawings, the condition of the neck of a particular femur required that the face to be provided by the facing tool 35 be positioned below that indicated in Fig. 6 of the drawings. Thus, I provide spacer ring or rings 44 which have an internal diameter so that they are snugly and slidably received on a stem 38 and have an external diameter of a size so they will snugly fit against the bottom face of a femoral head 39. These rings 44 are provided in various thicknesses so that a femoral head 39 is suitably positioned relative to a particular femur as may be required in indvidual cases. In practice I have found that the spacer rings 44 may be provided in thicknesses varying such as one-eighth, one-quarter, three-eighths, and one-half an inch. Obviously, other sizes may be furnished and obviously the amount of cutting by the facing tool 35 may be varied so as to cooperate with a spacer ring 44 to provide the desired distance of the femoral head 39 away from the body portion of a femur 22. Thus, in Fig. 11 of the drawings, the face 45 and wall 46 have been cut by a facing tool 35 and by employment of the spacer ring 44, the femoral head 39 has the desired elevation as respects the femur 22. In Fig. 11 of the drawings the sleeve bearing member 43 is disposed between and provides desired weight bearing relationship between the stem 38 and the area 26. The sleeve bearing member 43 is of a length less than the stem 38 between the cortical layer 21 through which said stem extends and the lower face of the femoral head 39. This space should be in the nature of approximately one-half of an inch as it is not unusual to have approximately one-quarter of an inch absorption of a femoral neck or the femoral supporting portion for a femoral head 39 after a femoral prosthesis operation. The sleeve bearing member 43 should not carry longitudinal strain and thus the same should be short enough, so that after bone absorption, the femoral head 39 is supported for weight bearing by the walls of opening 32, the area 26, and the remaining face, after absorption, below the original face 37. Thus specific cases will determine the length of sleeve bearing member 43.

Referring now to Fig. 12 of the drawings, it will be noted that the face 37 shown in Figs. 5 and 6 of the drawings has disappeared due to absorption of bone and that the level of the bone is now at the level 47 of Fig. 12 rather than at the former level of face 37. The greatest amount of bone absorption generally follows in a matter of weeks after the femoral prosthesis operation. However, in individual cases bone absorption may continue for longer periods of time. It is one of the features of this invention to provide for a femoral prosthesis which automatically adjusts itself as bone absorption occurs. Thus, the stem 38 can slide downwardly in the recess 32 when required so to do by reason of bone absorption, or, in other words, lowering of the face 37 down to a new level, such as 47. The stem 38 merely protrudes past the lateral cortex layer at the level or location of the opening 32 and a portion of the stem 38 thus projects into the soft tissues of the patient at this level. I have found that there are no serious disadvantages in projecting said stem into the soft tissues of a patient as just described.

In connection with Figs. 1 to 14 of the drawings, I have illustrated my invention in connection with a femoral head prosthesis wherein the natural socket 40 of the patient in the pelvic bones may be utilized and will support the femoral head 39. Often the natural socket of a patient must be reamed or otherwise reconstructed to be useful and at times we have patients who do not have a natural socket in the pelvic bones and particularly in the acetabular region.

Figure 14:
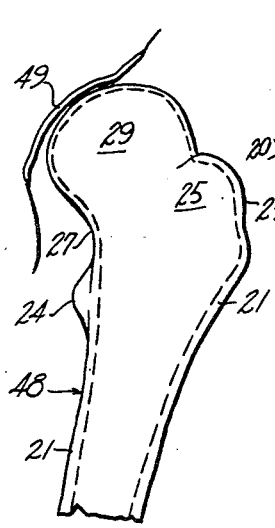

Referring now to Figs. 14 to 17 of the drawings there is illustrated a femoral head prosthesis operation in connection with a pelvic bone wherein the patient does not have a useful natural socket. Referring more particularly to Fig. 14 of the drawings, a fragment of the bone structures of a patient having a congenitally deformed bone structure at the level of the hip bones is illustrated. Also, the said view illustrates bone structures without a useful normal socket to receive a femoral head. The femur 48 in Fig. 14 is shown as rotated from normal as is not uncommon in said cases and hence the femur is viewed from a different angle in Fig. 14 than the same femur 48 is viewed in Figs. 15, 16, and 17 of the drawings. Thus, first of all the femur 48 should be angularly moved and properly located relative to the pelvis or pelvic bones 49 to a position such as that illustrated in Fig. 15 of the drawings to best utilize my invention.

Then the basic technic as discussed in connection with Figs. 1 to 13 of the drawings is employed which will include a proper incision, a removal of a portion of the femoral bone 48, dislocating the bone 48, providing the opening 32 and providing the face 37. Then a shaft 50 is slid into the opening 32 and a socket cutter-reamer device generally numbered 51 is disposed on the inner end of shaft 50 and then the bone 48 is aligned relative to the pelvic bone 49 so that said parts will be in the desired final alignment and particularly when a concave socket 52 is to be formed in the pelic bone 49 by the cutter 51. The shaft 50 terminates in a pointed end portion 53 and the shaft 50 is provided with means cooperating between the shaft 50 and the cutter or reamer 51 so that the cutter 51 is slidably and non-rotatively connected with the shaft 50. This may be accomplished by having flattened portions 54 on shaft 50 at the desired level and mating bosses 55 in the bore 56 of the cutter 51. Also, the shaft 50 is provided with shoulder portions 57 to limit longitudinal movement of the cutter 51 on the shaft 50 and so that pressure can be exerted on the shaft 50 which will in turn be exerted on the cutter 51 to cause the cutter 51 to be urged toward a surface to be cut, such as a pelvic bone 49. The protruding pointed end portion 53 of the shaft 50 functions as a guide or centering device to maintain the position of the cutter 51 until sufficient concave recess has been cut in the bone 49 and which recess thereafter will function as a centering means to complete the socket 52.

To start the cutting of the socket 52, the parts are aligned as previously indicated and pressure and rotary movements are provided on the shaft 50 which urges the protruding pointed portion 53 of the cutter 51 into the desired location in the pelvic bone 49. Cutting is continued until the results depicted in Fig. 15 have been accomplished. Thereafter the shaft 50 is replaced by a shaft 58 which is in all respects similar to the shaft 50 except that the shaft 58 does not terminate in the pointed end portion area mentioned in connection with shaft 50. Then the cutting is continued as depicted in Fig. 16 of the drawings and until the concave socket 52 is formed to the depth and size as indicated in both Figs. 16 and 17 of the drawings. Thereafter, the stem 38, femoral head 39, spacer ring 44 and truncated weight bearing cone 42 are placed in position in a manner similar to that described in connection with Figs. 1 to 13 inclusive of the drawings.

In cutting the socket 52, as described in connection with Figs. 14 to 17 of the drawings or in reconstructing a natural socket, I prefer to use the cutter 51. Most hip socket reamers now available on the market have been found unsatisfactory to accomplish the purposes above indicated and hence I have designed a new cutter 51 which will be discussed more in detail in connection with Figs. 18, 19, and 20 of the drawings.

The cutter or reamer 51 comprises a base plate 59 and arcuate cutting members 60 and 61, the external surfaces or peripheries of which (less the cutting edges as hereinafter explained) lie in a common sphere. The cutting member 61 has a peripheral surface which is substantially one-quarter of a sphere. The arcuate member 60 has a peripheral surface which is less than one-quarter a sphere to provide spaces just ahead of the cutting edges of each of the cutters 60 and 61. The cutting edges of the cutters 60 and 61 are respectively numbered 62 and 63. Preferably said cutting edges 62 and 63 lies in a helix which is generated about the axis of the hemispherical body in which the peripheries of the cutters 60 and 61 lie. A tubular member 64 functions as a support and extends between the base plate 59 and is secured to the upper end portions of the cutters 60 and 61. The cutters 60 and 61 are cut away to provide the opening 65 through which may extend the pointed end portion 53 of a shaft 50. Also, portions of the tubular member 64 are cut away to provide two portions 66 and permit free passage of bone or cartilage being cut away by the upper portions of the cutters 60 and 61.

The cutting edge 63 of cutter 61 is disposed radially outward from the convex surface of the cutter 61 by a desired amount such as the distance "$y$" indicated in Figs. 19 and 20 of the drawings. As one example of a practical cutter, I have found that the said distance "$y$" may be in the order of five one-thousandths of an inch. Preferably the cutting edge 62 of the cutter 60 extends outwardly from the spherical or convex surface of the cutter 60 by a graduating amount increasing from the base 59 toward the apex of the cutter 60. Thus in Fig. 19 the distance "$x$" is less than the distance "$z$" in Fig. 20 as Fig. 20 is taken substantially on broken line 20—20 of Fig. 15 and toward the upper portion while Fig. 19 is taken substantially on broken line 19—19 of Fig. 15 and is closer to the base of the convex or hemispherical shaped cutters 60 and 61. One practical form of cutter of my invention involves a cutting edge 62 projecting outwardly from the substantially spherical body by approximately fifteen-thousandths of an inch at its upper and tip portion while the said cutter 62 projects outwardly from said spherical body at its cutting portion adjacent to base 59 by an amount in the order of ten-thousandths of an inch. To obtain relative projection of the cutting edges 62 and 63 to their following body portions, the said cutting edges may be bent outwardly or material trailing the cutting edges may be relieved or ground away.

It is my desire that the cutter 60 shall perform the major portion of the cutting and that the cutter 61 shall be a smoothing or finishing type of cutter and hence the change in the amount of protrusion of the cutting edge away from the spherical body in which the major portions of the cutters 60 and 61 have their peripheries disposed.

By having the cutter 61 with a periphery which is substantially one-quarter a sphere, the major portion of the external periphery of said cutter 61 functions as a guide means and urges the cutting portion 62 of the cutter 60 into cutting engagement against the walls of the cut hole or concave depression. Also, by having said external periphery of the cutter 61 forming substantially a quarter of a sphere, I have found that a more precise and accurate concave recess may be either drilled in bone or cartilage or reamed out in a natural socket to a more accurate hemispherical concave recess. In short, it may be accurately stated that the said cutter of my invention provides for rapid as well as precision drilling or cutting.

In connection with the providing of a concave recess in an acetabulum bone of the pelvic bones, there are generally substantial quantities of cartilage as well as bone to be drilled. When ordinary reamers are employed, the cartilage tends to cut away in fragments and remain in the path of the reamer or in the openings of the reamer and thus interfere with the providing of a precise concave cavity. On the other hand, with the socket cutter or reamer of my invention, the openings just preceding the cutters 60 and 61 provide a means for receiving the said cartilage so that it is removed from the path of the cutting edges and a very smooth and uniform recess may be cut with the said cutter or reamer 51 of my invention.

Referring again to Figs. 15, 16 and 17 of the drawings, it will be noted that the reamer 52 may be removed from either the shaft 50 or 58. Thus the opening 32 is first prepared and the shaft 50 or 52 moved upwardly through said opening 32 and through the opening through the cancellous bone and thereafter the reamer or cutter 52 is placed in direct alignment with said opening 32 so that the socket made or reamed in a pelvic bone, such as 49, is positively aligned with the femoral head 39 which is employed after a suitable socket in said pelvic bone is provided. Thus in my invention I not only provide a femoral head 39, which is aligned with the axis of the stem 38 so as to provide for free rotation of said head 39 and the other advantages of the positioning of the stem or shaft 38 as previously explained, but I provide means so that a pelvic socket can be cut or reamed so that the same will positively align with said head 39.

From the foregoing it will amply appear that my invention contemplates providing an opening in the femoral shaft posterior to the center of the shaft and distal in the order of about two inches of the distal edge of the greater trochanter. As femoral shafts vary with individuals, the said distance of about two inches, of course, will vary. I desire to place said initial opening from the outside through the cortex layer of the femoral shaft and at a location so that I may later drill or provide a cylindrical opening extending from the central area of the femoral neck, spaced from but close to the lateral aspect of the medial cortex of the lower end of the femoral neck. Thus, care should be taken in drilling the initial opening from the outside through the cortex layer of the femoral shaft as an opening is necessary so that a drill can be operated and urged downwardly from the femoral neck and out the original opening made in the femoral shaft. I desire that the angle shall be as close to the vertical as is possible and yet leave a space between the opening and the lateral aspect of the medial cortex of the lower end of the femoral neck.

After the cylindrical opening just described is provided, preferably I enlarge said opening and precisely drill the femoral shaft so that there is a precise opening to slidably receive the stem or pedicle of a femoral prosthesis. In my invention, the said stem or pedicle is free to slide downwardly and this automatically takes care of the lowering of a face on a femoral neck due to normal and inevitable reduction of the length of a femoral shaft due to bone absorption following a femoral prosthesis operation. Also, the flat bottom surface portion of the femoral head prosthesis is of substantial value in my invention as the entire cortical material presented, after a femoral neck has been faced to provide a surface layer in a common plane, may be utilized to support weight.

Next, by having the pedicle or stem of the femoral prosthesis as close to a vertical line as possible, I provide for relatively free rotation of a femoral prosthesis head in the socket which is utilized and which socket may be a natural socket, a natural socket reamed or cut to a desired shape and size, or may be an artificial socket created in a pelvic bone.

Figure 17:
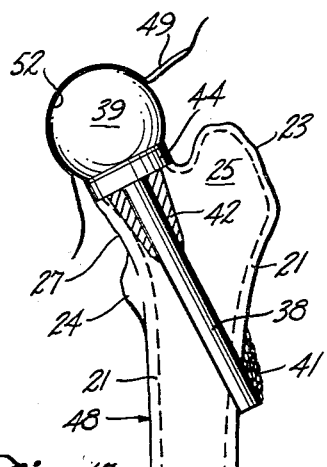

In connection with Figs. 15, 16, and 17 of the drawings I have shown the reamer-cutter of my invention employed in connection with providing a socket in a pelvic bone for reception therein of a femoral head prosthesis. However, it is to be expressly understood that the said cutter-reamer of my invention may be employed in connection with reaming or cutting in connection with a socket in a pelvic bone for reception therein of a natural femoral head as distinguished from a femoral head prosthesis, and also said cutter-reamer 51 of my invention has other fields of use, such as in connection with the socket for the head of a humerus.

Referring again to the conical sleeve member shown in Fig. 7 of the drawings as well as to the sleeve like member shown in Fig. 10 of the drawings, the advancing edge portion of each thereof is preferably brought to a narrow edge portion so as to facilitate insertion of each into the cancellous bone and without further reaming of the cylindrical opening 32 made therethrough. Also, each of said members functions as a weight bearing member so that weight is carried by the lateral aspect of the medial cortex of the lower end of the femoral neck. Each of said members should be freely slidable so that movement will not be restrained because of the size of opening in the femoral neck. When the conical member shown in Fig. 7 of the drawings is used, pressure on the inclined surfaces of said conical member provides a force urging the conical member upwardly and against the base or lower flat surface supporting the femoral prosthesis head 39. In some instances, I desire to use the said tubular member 43 shown in Fig. 10 of the drawings and when the same is used it should be of a length so the same does not carry longitudinal strain and thus permits the pedicle or stem of the prosthesis to slide downwardly when required because of bone absorption. The said sleeve 43 should rest against the inner wall of the cortex layer as is indicated in Fig. 11 of the drawings, and thus whether the conical member 42 of Fig. 7 or the cylindrical member 43 of Fig. 10 is employed, in each instance there is cooperation between such a weight bearing member and a femur so that a portion of the said weight bearing member is always maintained at a level so it can cooperate with and provide weight against the lateral aspect of the medial cortex of the lower end of the femoral neck.

Obviously changes may be made in the form, dimensions and arrangements of the parts of my invention without departing from the principle thereof, the above setting forth only preferred forms of embodiment of my invention.

I claim:

1. A femoral prosthesis comprising a substantially hemispherical prosthesis head having a flat bottom surface portion lying substantially in a common plane and adapted to rest flush against a flat surface portion provided on a femur at the femoral neck portion; a shaft portion round in section and connected with said prosthesis head and extending away from and substantially at right angles to the plane of said flat bottom surface portion; and a weight bearing member resisting lateral strain and slidably carried by said shaft portion, of a size to snugly enter the canal in a femur and of a length greater than its cross dimension, and provided with means cooperating with a femur to limit downward travel of said weight bearing member on said shaft portion, whereby a drill opening may be provided in a femur extending downwardly from the femoral neck and having an axis aligned substantially with the central area of the femoral neck, spaced from the lateral aspect of the medial cortex of the lower end of the femoral neck and extending through for slidable and rotary movements relative to the femoral shaft posterior to the center of the shaft and distal in the order of about two inches of the distal edge of the greater trochanter and said shaft may be positioned in said opening and with the weight bearing member contacting the inner wall of the lateral aspect of the medial cortex of the lower end of the femoral neck.

2. A femoral prosthesis comprising a substantially hemispherical prosthesis head having a flat bottom surface portion lying substantially in a common plane and adapted to rest flush against a flat surface portion provided on a femur at the femoral neck portion; a shaft portion round in section and connected with said prosthesis head and extending away from and substantially at right angles to the plane of said flat bottom surface portion; and a conical weight bearing member slidably carried by said shaft portion and urged upwardly on said shaft by pressure exerted on its conical surface, whereby a drill opening may be provided in a femur extending downwardly from the femoral neck and having an axis aligned substantially with the central area of the femoral neck, spaced from the lateral aspect of the medial cortex of the lower end of the femoral neck and extending through for slidable and rotary movements relative to the femoral shaft posterior to the center of the shaft and distal in the order of about two inches of the distal edge of the greater trochanter and said shaft may be positioned in said opening and with the weight bearing member contacting the inner wall of the lateral aspect of the medial cortex of the lower end of the femoral neck.

3. A femoral prosthesis comprising a substantially hemispherical prosthesis head having a flat bottom surface portion lying substantially in a common plane and adapted to rest flush against a flat surface portion provided on a femur at the femoral neck portion; a shaft portion round in section and connected with said prosthesis head and extending away from and substantially at right angles to the plane of said flat bottom surface portion; and a tubular weight bearing member resisting lateral strain and slidably carried by said shaft portion, of a size to snugly enter the canal in a femur and of a length greater than its cross dimension, and of a length less than the distance between said flat surface portion on the femur and the inner wall of the cortex layer of a femoral shaft through which the said prosthesis shaft portion may extend, whereby a drill opening may be provided in a femur extending downwardly from the femoral neck and having an axis aligned substantially with the central area of the femoral neck, spaced from the lateral aspect of the medial cortex of the lower end of the femoral neck and extending through for slidable and rotary movements relative to the femoral shaft posterior to the center of the shaft and distal in the order of about two inches of the distal edge of the greater trochanter and said shaft may be positioned in said opening and with the weight bearing member contacting the inner wall of the lateral aspect of the medial cortex of the lower end of the femoral neck.

References Cited in the file of this patent

UNITED STATES PATENTS

| 1,630,239 | Binkley et al. | May 24, 1937 |
| 2,136,471 | Schneider | Nov. 15, 1938 |
| 2,526,662 | Hipps et al. | Oct. 24, 1950 |
| 2,612,159 | Collison | Sept. 30, 1952 |
| 2,622,592 | Rosenstein | Dec. 23, 1952 |

FOREIGN PATENTS

| 461,210 | Canada | Nov. 22, 1949 |

OTHER REFERENCES

The Journal of Bone and Joint Surgery, for January 1952, pp. 175–181. (Copy in Scientific Library.)

Industrial and Engineering Chemistry, for November 1937, p. 1316.

The Journal of Bone and Joint Surgery, for January 1951, v. 33A; pp. 66, 67 and 70. (Copy in Scientific Library.)